SMALL SIGNAL OPERATED-CONTROL SYSTEM FOR ELECTRICAL LOADS
Filed June 27, 1963
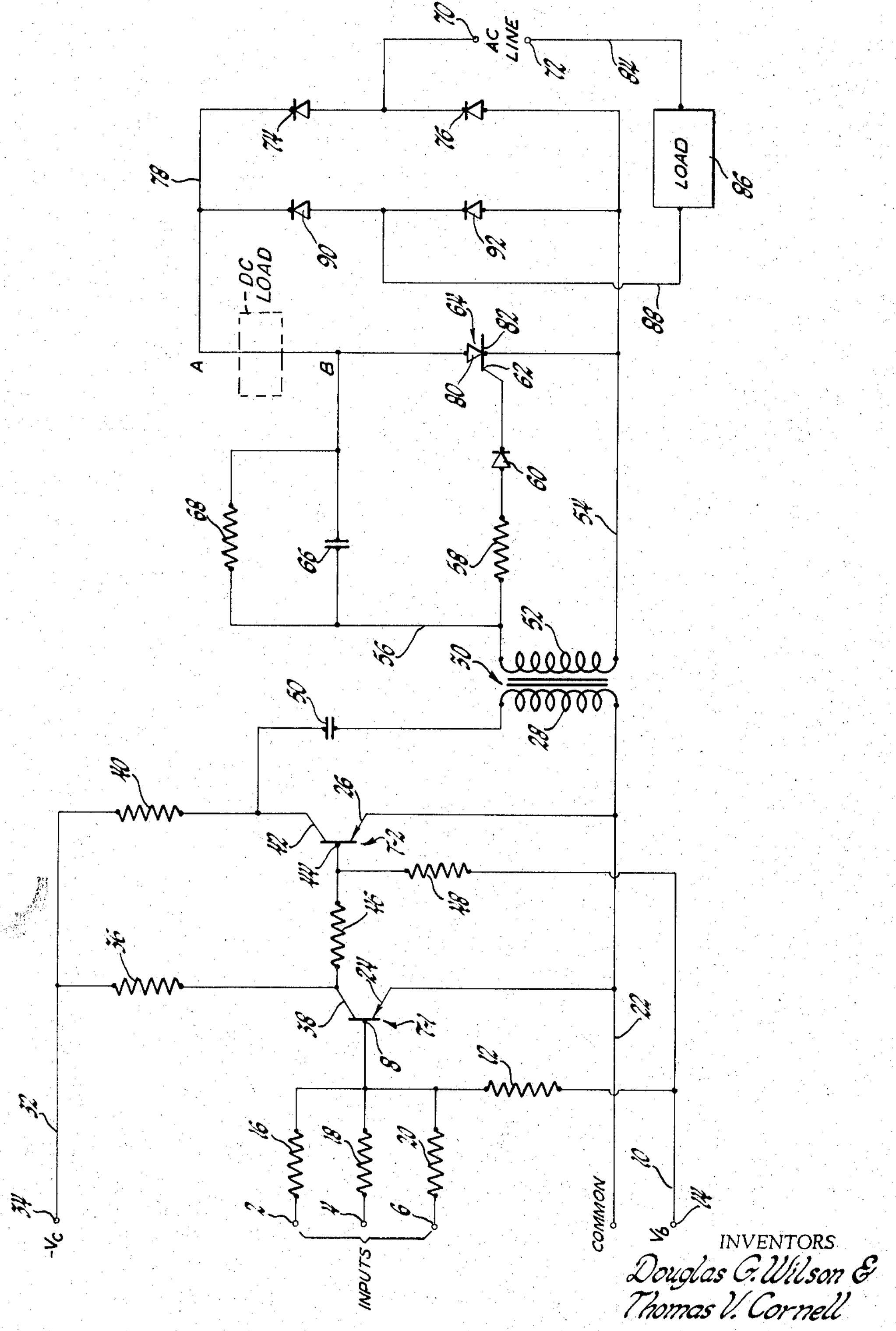
INVENTORS
Douglas G. Wilson &
Thomas V. Cornell
Robert E. Fowler
ATTORNEY United States Patent Office 3,356,859

Patented Dec. 5, 1967

3,356,859

SMALL SIGNAL OPERATED-CONTROL SYSTEM FOR ELECTRICAL LOADS

Douglas G. Wilson, Kokomo, and Thomas V. Cornell, Marion, Ind., assignors to General Motors Corporation, Detroit, Mich., a corporation of Delaware Filed June 27, 1963, Ser. No. 291,054
1 Claim. (Cl. 307—88.5)

ABSTRACT OF THE DISCLOSURE

An electrical control system for energizing and de-energizing loads using input signals for operating a silicon controlled rectifier and having no moving parts.

This invention relates to an electric semiconductor circuit for controlling a load upon the application of low power signals and which has no moving parts.

In general the system consists of a circuit in which a load supplied from a conventional 110 volt AC line is controlled by small power signals such as those produced in computers or logic systems.

There are currently more and more applications requiring fast continuous control operation. If such can be provided by means without movable parts the chances of failure and the necessity for service and repair are obviously reduced.

It is an object in making this invention to provide an electrical semiconductor system for controlling a load supplied from a conventional power line with low power signal.

It is a further objects in making this invention to provide an electrical system utilizing one or more low power pulses to control either a DC or an AC load supplied from a conventional AC power line.

With these and other objects in view which will become apparent as the specification proceeds, our invention will be best understood by reference to the following specification and claim and the illustrations in the accompanying drawings, in which:

The figure is a circuit diagram of an electric semiconductor system embodying the invention.

Referring now more particularly to the drawing, the overall control circuit may be described as consisting of three sections;

(1) a transistor amplifier section for amplifying the low power control signals on the left;
(2) a gating signal network section in the center; and
(3) a rectifier bridge combined with a silicon controlled rectifier section on the righthand side associated with the load being controlled.

The low power control signals are applied at the left to terminals 2, 4 and 6 from any desired input that may be utilized for controlling the load. The amplifier section includes two transistors T–1 and T–2 for amplifying the control pulses applied to terminals 2, 4 and 6. These two transistors are connected in cascade and are supplied with suitable biasing voltages for proper operation. Transistor T–1 has a base electrode 8 connected to supply line 10 through a biasing resistor 12. The proper voltage bias $V_b$ is applied to terminal 14 to which supply line 10 is connected. Each of the input terminals is also connected to the base 8 through limiting resistors 16, 18 and 20, respectively. A ground or common line 22 is connected directly to the emitter electrode 24 of transistor T–1, to the emitter electrode 26 of transistor T–2 and also to the lower terminal of primary 28 of coupling transformer 30. The proper collector biasing voltage $V_c$ is applied to supply line 32 through terminal 34. Line 32 is connected through a biasing resistor 36 to the collector electrode 38 of transistor T–1 and through a similar biasing resistor 40 to the collector electrode 42 of transistor T–2. The collector electrode 38 of transistor T–1 is directly connected to the base electrode 44 of transistor T–2 through resistor 46. Supply line 10 is likewise connected to base 44 of transistor T–2 through a resistance 48. The output of the two-stage amplifier is coupled to the primary 28 of the transformer 30 through condenser 50 which interconnects the collector 42 to the upper terminal of the primary 28. Various signals applied to any of the terminals 2, 4 or 6, therefore, control the conductivity of transistor T–1 which in turn controls the conductivity of its associated cascaded transistor T–2 for purposes to be further explained. Normally with no signal input to any terminal 2, 4 or 6 and with the proper voltages applied to terminals 34, common and 14, transistor T–2 will be conductive and transistor T–1 will be biased off. This will determine the amount of impedance in the primary winding 28 of transformer 30 which will be reflected into the secondary for control purposes.

The second section of the control system has been described as a gating signal network. It includes the secondary winding 52 of the transformer 30 which has the lower terminal of its winding connected to conductor 54. Its upper terminal is connected to conductor 56 and to one terminal of a resistance 58 in series with a diode 60 to the control electrode 62 of a silicon controlled rectifier 64. Line 56 is connected to a condenser 66 and to one terminal of a resistance 68 in shunt therewith. This network, whose impedance is changed by the appearance of input signals in the amplifier, controls the rectifier bridge as will be more specifically described.

The last section of the system to be described is the rectifier bridge and silicon controlled rectifier circuit which actually controls the power to the load. This is that circuitry in the righthand portion of the diagram. The conventional AC line is connected to terminals 70 and 72, terminal 70 being connected to a position intermediate two rectifiers 74 and 76 both poled for conduction in the same direction. The cathode of rectifier 74 is connected through conductor 78 with the gating signal network and specifically with one side of resistor 68 and condenser 66 and the anode 80 of the silicon controlled rectifier 64. The cathode 82 of this rectifier is connected to conductor 54. Terminal 72 of the main power line is connected through conductor 84 to one side of the load 86 and thence through a conductor 88 to a point intermediate two further rectifiers 90 and 92 forming the other side of the bridge. The cathode of rectifier 90 is connected to conductor 78 and the anode of rectifier 92 is connected to line 54.

With these connections, and assuming for the moment that the silicon controlled rectifier 64 is conducting, power from the incoming line connected to terminals 70 and 72 will be applied on alternate half cycles to the load 86 through the following circuits. Assuming that in the first half cycle the voltage on terminal 70 goes positive with respect to that on 72, current will flow from terminal 70 through rectifier 74, line 78, silicon controlled rectifier 80, line 54, rectifier 92, line 88 through the load 86 back through the line 84 to terminal 72. On the next half cycle when the voltage on terminal 70 goes negative with respect to terminal 72 the current will flow from terminal 72 through line 84, load 86, line 88, rectifier 90, silicon controlled rectifier 64, line 54, rectifier 76 to the other terminal 70. In this manner alternating current is continuously applied to the load 86 through the rectifier bridge as long as the silicon controlled rectifier remains conductive. At this point it is desired to point out that during such operation direct current is always flowing through the silicon controlled rectifier 64 and through the conductor in series therewith. It would, therefore, be possible to insert a DC load between points A and B and control and supply that with DC current either simultaneously or separately by suitable switching means. It is normally assumed that in the absence of any input signals to any of the terminals 2, 4 or 6 no current would be supplied to either the AC load 86 or any possible DC load connected between points A and B. Upon arrival of an input signal to any one of these terminals or any combination of signals thereto, depending upon the design of the system, current would be allowed to flow in the bridge circuit and apply power for the load.

The operation of the circuit is as follows. With the proper power applied to terminals 34, 14 and common, transistor T–2 will be biased to conduct. With T–2 conducting a relatively low impedance will be reflected into the secondary 52. This low impedance characteristic at the secondary winding 52 under these conditions will cause current to flow through the parallel circuit formed by resistance 68 and condenser 66 from the output of the rectifier bridge and it will be shunted around the gate of the silicon controlled rectifier 64, input network consisting of resistance 58 and diode 60. The silicon controlled rectifier 64 will, therefore, be cut off and no current can flow in the various load power circuits previously traced. If, however, the proper signal or signals are applied to the input terminals 2, 4 or 6, T–1 will be driven conductive. When T–1 conducts, the potential on its collector electrode 38 will change varying the potential on the base electrode 44 of T–2 and turning that transistor off. This increases the impedance at primary winding 28 which is reflected into the secondary 52 also increasing the impedance in the secondary circuit. This cuts down current flow through the secondary winding 52 and causes current to flow from resistor 68 and condenser 66 into the gate control network of resistance 58 and diode 60 to turn on the silicon controlled rectifier 64 as soon as that particular half cycle of power is completed. The silicon controlled rectifier 64 now permits the flow of current through the rectifier bridge to the load.

This circuit has many advantages. It isolates the signal input from the actual load through a transformer. It provides a circuit so that either an AC or a DC load can be controlled and supplied from an AC source. It provides a fast acting, efficient circuit and one in which the amount of power utilized by the load can be accurately and readily adjusted.

What is claimed is:

A circuit for controlling the application of alternating current to a load in response to externally obtained input signals comprising: an input amplifier section including at least one transistor having a pair of output electrodes and a control electrode, biasing means connected to the control electrode for normally maintaining the transistor in a conductive state, and at least one input circuit connected to the control electrode of the transistor and responsive to an input signal to overcome the biasing means and render the transistor nonconductive; an output section including a rectifier bridge having two pairs of terminals, a source of AC current, an AC load, the source and the load being connected in series relation across one pair of terminals; a gating section including a transformer having primary and secondary windings, the primary winding being connected in parallel with the output electrodes of the transistor to reflect an impedance into the secondary winding related to the state of the transistor, an SCR having cathode, anode and control electrodes, the anode and cathode electrodes being connected across the other pair of bridge terminals thereby to provide current paths from the source through the load in opposite directions but through the SCR in one direction, the secondary winding of the transformer being connected on one end to the SCR cathode, an RC network connected between the SCR anode and the other end of the secondary winding to provide a signal path shunting the SCR when a relatively low impedance is reflected into the secondary winding, and a unidirectionally conducting circuit connected between said other end of the secondary winding and the control electrode of the SCR to provide a signal path into the control electrode when a relatively high impedance is reflected into the secondary winding.

References Cited

UNITED STATES PATENTS

| | | | |
|---|---|---|---|
| 3,098,966 | 7/1963 | Raver | 322—28 |
| 3,287,617 | 11/1966 | Robinson | 307—88.5 X |
| 3,064,174 | 11/1962 | Dinger | 318—331 |
| 3,177,418 | 4/1965 | Meng | 318—331 |
| 3,244,965 | 4/1966 | Gutzwiller | 323—22 |
| 3,204,172 | 8/1965 | Darling et al. | 321—8 |
| 3,207,975 | 9/1965 | Pintell | 323—22 |
| 3,210,605 | 10/1965 | Jones | 317—33 |
| 3,221,241 | 11/1965 | Greenberg et al. | 321—47 |
| 3,231,812 | 1/1966 | Paley | 321—18 |

JOHN F. COUCH, *Primary Examiner.*

W. E. RAY, W. H. BEHA, Jr., *Assistant Examiners*